United States Patent
Rajput et al.

(10) Patent No.: US 8,719,025 B2
(45) Date of Patent: May 6, 2014

(54) CONTEXTUAL VOICE QUERY DILATION TO IMPROVE SPOKEN WEB SEARCHING

(75) Inventors: Nitendra Rajput, New Delhi (IN); Kundan Shrivastava, Faridabad (IN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 13/470,548

(22) Filed: May 14, 2012

(65) Prior Publication Data
US 2013/0304471 A1  Nov. 14, 2013

(51) Int. Cl.
*G10L 15/08* (2006.01)
*G10L 15/26* (2006.01)

(52) U.S. Cl.
USPC ........... 704/257; 704/251; 704/275; 707/713; 707/740

(58) Field of Classification Search
USPC ................... 704/251, 257; 707/713, 765, 768
See application file for complete search history.

(56) References Cited

U.S. PATENT DOCUMENTS

| | | | |
|---|---|---|---|
| 5,826,260 A * | 10/1998 | Byrd, Jr. et al. | 1/1 |
| 6,418,431 B1 * | 7/2002 | Mahajan et al. | 1/1 |
| 6,856,957 B1 * | 2/2005 | Dumoulin | 704/257 |
| 7,027,987 B1 | 4/2006 | Franz et al. | |
| 7,287,025 B2 * | 10/2007 | Wen et al. | 1/1 |
| 7,672,931 B2 | 3/2010 | Hurst-Hiller et al. | |
| 7,685,119 B2 * | 3/2010 | Riise et al. | 707/999.005 |
| 7,831,588 B2 * | 11/2010 | Jones et al. | 707/713 |
| 8,046,220 B2 | 10/2011 | Agarwal et al. | |
| 2002/0059161 A1 * | 5/2002 | Li | 707/1 |
| 2002/0069059 A1 * | 6/2002 | Smith | 704/257 |
| 2005/0091197 A1 * | 4/2005 | Dettinger et al. | 707/3 |
| 2006/0047632 A1 * | 3/2006 | Zhang | 707/3 |
| 2009/0043581 A1 | 2/2009 | Abbott et al. | |
| 2010/0070506 A1 * | 3/2010 | Whang et al. | 707/740 |
| 2011/0047161 A1 * | 2/2011 | Myaeng et al. | 707/740 |
| 2011/0145214 A1 | 6/2011 | Zhang et al. | |

OTHER PUBLICATIONS

Cui et al. "Query Expansion by Mining User Logs", IEEE Transactions on Knowledge and Data Engineering, vol. 15, No. 4, Jul. 2003.*
Bhogal et al. "A review of ontology based query expansion", , Information Processing and Management vol. 43, Published by Elsevier Ltd., 2007.*
Ajmera et al. Two-Stream Indexing for Spoken Web Search, WWW 2011—Web for Emerging Regions Paper, Mar. 28-Apr. 1, 2011.
Mamou et al., Improved Spoken Query Transcription Using Co-Occurrence Information, downloaded Feb. 27, 2012, pp. 1-4.

(Continued)

*Primary Examiner* — Jialong He
(74) *Attorney, Agent, or Firm* — Ryan, Mason & Lewis, LLP (57) ABSTRACT

An apparatus and an article of manufacture for contextual voice query dilation in a Spoken Web search include determining a context in which a voice query is created, generating a set of multiple voice query terms based on the context and information derived by a speech recognizer component pertaining to the voice query, and processing the set of query terms with at least one dilation operator to produce a dilated set of queries.

10 Claims, 3 Drawing Sheets

(56) References Cited

OTHER PUBLICATIONS

Diao et al. Faceted Search and Browsing of Audio Content on Spoken Web, proceedings CIKM'10 Proceedings of the 19th ACM International Conference on Information and Knowledge Management ACM New York, NY, 2010, pp. 1-9.

Johnson et al., A Method for Direct Audio Search with Applications to Indexing and Retrieval, in Proc. of IEEE ICASSP, 2000, pp. 1-4.

Xu et al., Query Expansion Using Local and Global Document Analysis, SIGIR 1996.

Qiu et al., Concept Based Query Expansion, SIGIR 1993, pp. 1-11.

Chirita et al. Pros: A Personalized Ranking Platform for Web Search, In AH'04: Adaptive Hypermedia and Adaptive Web-Based Systems, pp. 34-43, 2004.

* cited by examiner

CONTEXTUAL VOICE QUERY DILATION TO IMPROVE SPOKEN WEB SEARCHING

FIELD OF THE INVENTION

Embodiments of the invention generally relate to information technology, and, more particularly, to Spoken Web searching.

BACKGROUND

Spoken Web searching involves taking a voice query as input and determining the content that is an appropriate or relevant response to the query. However, with existing approaches, the conversion of the voice query to text can be ambiguous owing to factors such as, for example, the quality and/or accuracy of the speech recognition system. If the query is incorrectly converted, the search results can suffer. Additionally, many existing speech recognition systems have low accuracy for voice queries, particularly with respect to open-ended queries and isolated words where the grammar syntax cannot be enforced.

Accordingly, improved Spoken Web search techniques are needed.

SUMMARY

In one aspect of the present invention, techniques for contextual voice query dilation are provided. An exemplary computer-implemented method for contextual voice query dilation in a Spoken Web search can include steps of determining a context in which a voice query is created, generating a set of multiple voice query terms based on the context and information derived by a speech recognizer component pertaining to the voice query, and processing the set of query terms with at least one dilation operator to produce a dilated set of queries.

In another aspect of the invention techniques for performing a search on a voice query is also provided, including the steps of generating a set of multiple query terms based on information derived by a speech recognizer component processing a voice query, processing the set of query terms with multiple dilation operators to produce multiple dilated subsets of query terms, selecting at least one query term from each dilated sub-set to compose a query set, and performing a search on the query set.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes contextual voice query dilation to improve Spoken Web searching. At least one embodiment of the invention includes determining the context in which a voice query is created and using this context and the knowledge of a speech recognizer component to generate a multitude of voice queries. Having a large number of queries will facilitate obtaining more search results and increase the likelihood of producing the result in which the user is interested.

As described herein, at least one embodiment of the invention includes removing the search dependency on the recognition of one query word by designing a mechanism to generate multiple possible variations of the query and therefore create an estimation of a query vector from a query word or phrase. Accordingly, given a query q, the techniques detailed herein can include generating an estimate for the query vector $\{q'_1, q'_2, \ldots, q'_L\}$.

At least one embodiment of the invention includes generating a list of similar (referred to herein as n-best) results from the speech recognizer. Because the speech recognizer provides a probabilistic output, it can be configured so that more than one possible result can be provided. An n-best list refers to the n possible text results that the speech recognizer can provide for a given audio input. In at least one embodiment of the invention, such a list can be ranked, for example, with the probability scores of each possible result being the correct response. Additionally, such a list can be filtered through dilation operators, as further detailed herein. If there are fewer output results (as an example, if the results are of the order three or less), at least one embodiment of the invention includes determining the edit-distance between the dilation operator words and the n-best list match.

Additionally, a listing or sub-set of the results can be selected from the output of each dilation filter and used to compose a query set. By way of example, each dilation operator can generate possible query terms, and the top k output of each such dilation operator can be chosen based on a threshold to compose the query set across all dilation operators. A search can be performed on this query set and, in at least one embodiment of the invention, the results can be ranked such that the results occurring in more elements of the dilation output are ranked higher.

Accordingly, at least one embodiment of the invention removes the dependency on speech recognition of an entire search result set. Additionally, the techniques detailed herein can improve the recall for a specific query, and being specific to a user, the search result can also provide a user with content that may be of relevance to him or her even if that content was not specifically searching for by the user.

As noted above, at least one embodiment of the invention includes using dilation operators. In an example embodiment of the invention, the dilation operators include operators that expand a query based on the questions of who, what, when and where. By way of example, one such dilation operator can include considerations such as who the other users are having a similarity with the query user, whether a user is extracted through demographics information, through collaborative filtering on logs, etc., as well as a weighted list of search terms that are commonly searched by this group of users.

Another such dilation operator can include considerations such as identifying the prior searches performed by a user, as well as extrapolating the domain using ontologies to generate a list of search terms. Additionally, another dilation operator can include considerations such as the month, week and/or day when the user is generating the query, as well as generating a list of the query words that are generated during those times by other users. Further, yet another dilation operator can include considerations such as where the query was generated, obtaining such information from the demographics of the query creator, and obtaining a list of query terms that are generated by people in the target region.

Figure 1:
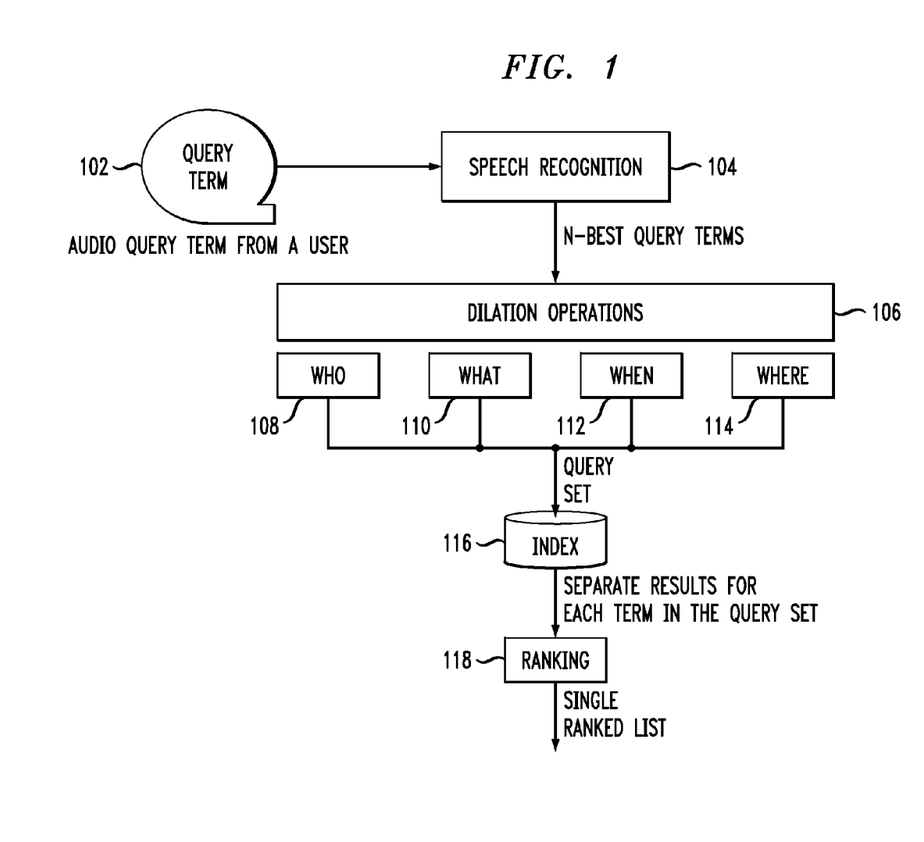
FIG. 1 is a diagram illustrating system architecture, according to an embodiment of the present invention.

FIG. 1 is a diagram illustrating system architecture, according to an embodiment of the present invention. By way of illustration, FIG. 1 depicts a query term 102, which can include an audio query term provided by a user to a speech recognition module 104. By way of example, any standard speech recognition system can be used in module 104. An example of such a speech recognition system includes a statistical speech recognizer that takes audio output and generates acoustic model scores based on the closeness of the audio with the phones in the acoustic model. Such a system also generates language model scores by determining the possibility of such a language construct being used in the language of the speech recognizer. The statistical speech recognizer also generates a combined score for the possible output values from their acoustic model and the language model scores. Further, the statistical speech recognizer can use statistical information pertaining to the language to train the acoustic and language models.

Accordingly, as depicted in FIG. 1, the speech recognition module 104 generates the n-best query terms based upon query term 102, and provides the same to a dilation operations module 106. As described above, the dilation operations module 106 can include dilation operators such as a "who" dilation operator 108, a "what" dilation operator 110, a "when" dilation operator 112 and a "where" dilation operator 114.

The dilation operations module 106, via processing carried out by the dilation operators, produces a query set and forwards the query set to an index database 116. The index database 116 separates results from each term in the query set. As an example, the output of a dilation operator 108 can be a set of possible queries. Each query in this set will be passed to the index to search for a relevant document from the database. Thus, a set of results will be generated for queries from the dilation operator 108. Similar results will be generated from other dilation operator queries. These independent search results through the queries of the different dilation operators and the index are sent to ranking module 118, which ranks the query set input and generates a combined ranked list output.

In at least one embodiment of the invention, the combined ranked list output is generated based on the following parameters: the weight that is assigned to the dilation operators (the gamma parameter, as detailed further below), the weight of each dilation operator ($w_1, w_2, \ldots w_n$), and the score of the output of the indexed database results ($w_1'', w_2'', \ldots w_k''$). Using these parameters ensures that the system is configurable through the parameter gamma, a high value of which means that the system does not weight the dilation technique strongly and relies more on the query itself. In conditions where the speech-to-text quality is very good, a high value of gamma should be used. However, if the speech recognizer output is not reliable, a low value of gamma should be used. The different weights of the dilation parameters ($w_1$ to $w_n$, assuming that there are n dilation parameters) show what value is ascertained to the different parameters based on the context of the application. The weights for the $n^{th}$ query ($w_1'', w_2'', \ldots w_k''$) (assuming that there were k results from the indexed database for a particular query) can be standard ranked.

As noted above, at least one embodiment of the invention includes using the gamma parameter in connection with ranking, detailed as follows:

$$\text{Query } q \stackrel{(\alpha)}{\rightarrow} \text{INDEX} \rightarrow \text{Ranked results } (\gamma_1, \gamma_2, \ldots \gamma_n)$$

Dilated queries

The final ranked results can be delivered from a combination of $\alpha$, $w_1$-$w_n$ and $\{\vec{w}_1, \vec{w}_2, \ldots \vec{w}_k\}$.

Figure 2:
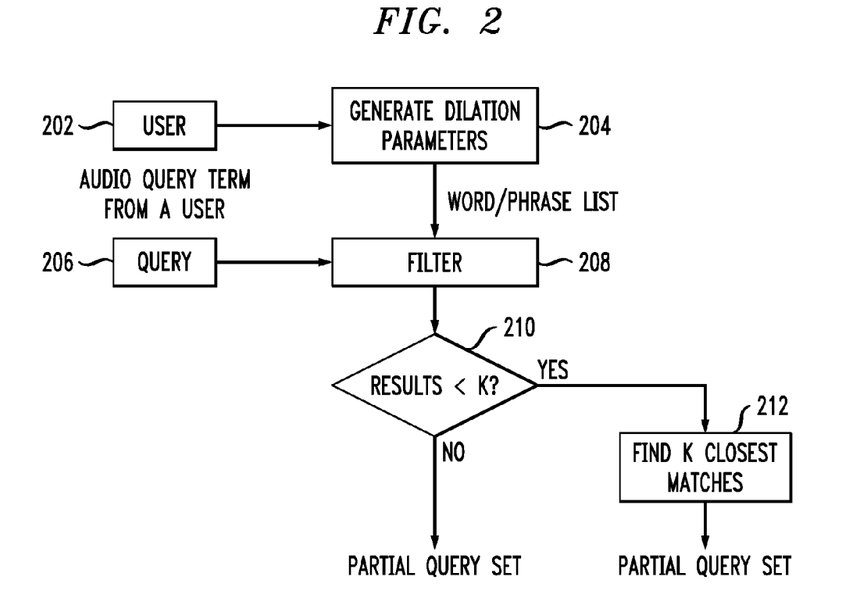
FIG. 2 is a diagram illustrating a dilation mechanism, according to an embodiment of the present invention.

FIG. 2 is a diagram illustrating a dilation mechanism, according to an embodiment of the present invention. By way of illustration, FIG. 2 depicts a user component 202, which provides input to generate dilation parameters in step 204. Additionally, a query (for example, an audio query term provided by a user) 206 is provided to a filter module 208 along with a word and/or phrase list generated based on the dilation parameters.

Step 210 includes determining whether filtering produces results that are less than a threshold K. This threshold is a configurable parameter that controls the number of queries that need to be created from the original query. A large value of K can result in higher precision but lower recall, meaning that the search results may have incorrect documents, but more documents may be retrieved. A low value of K will result in fewer documents, but most would likely be relevant. If the results are not less than the threshold K, a partial query set is output. If the results are less than the threshold K, step 212 includes determining the K closest matches and subsequently outputting a partial query set.

Step 212 provides, for example, for cases where the speech recognizer is not able to provide a good result of the initial query. As an example, the word "Manchester" in an original query might have been decoded as "Fan wrest her." In such a case, the K closest matches of the phrase "Fan wrest her" to the words in dilation step 204 will be provided as an output in step 212. The matches can be found by using a string edit-distance measure.

Figure 3:
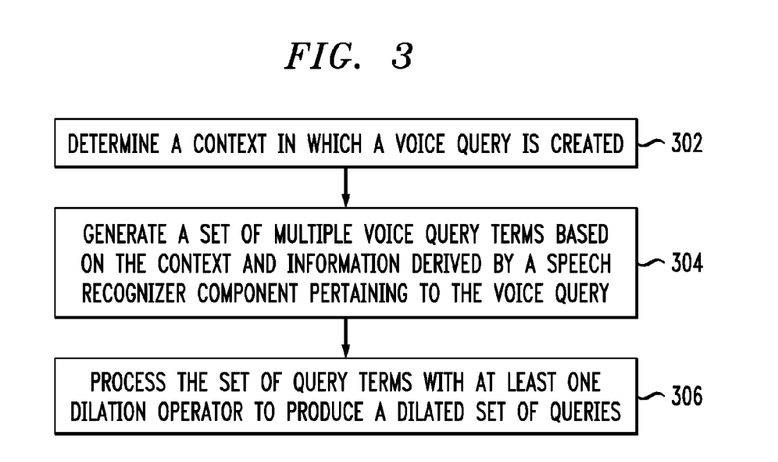
FIG. 3 is a flow diagram illustrating techniques for contextual voice query dilation in a Spoken Web search, according to an embodiment of the invention.

FIG. 3 is a flow diagram illustrating techniques for contextual voice query dilation in a Spoken Web search, according to an embodiment of the present invention. Step 302 includes determining a context in which a voice query is created. The determining step can include analyzing, for example, demographics of the user, social network information, prior user preferences, etc. Such analysis can also include determining a list of possible queries related to the voice query. Additionally, the determining step can be based on a creator of the query, a history of other queries created by the creator, when the query is created and/or where the query is created.

Step 304 includes generating a set of multiple voice query terms based on the context and information derived by a speech recognizer component pertaining to the voice query. The generating step can include generating queries based on an ontology of search terms and/or an existing word database that contains related search terms.

Step 306 includes processing the set of query terms with at least one dilation operator to produce a dilated set of queries. Processing can include, for example, analyzing information about similar queries made by other users during a determined timeframe, analyzing other users that have a similarity with the query user, and/or determining a weighted list of search terms that are commonly searched by a related group of users. Additionally, processing can include identifying prior searches performed by a user, as well as determining a geographic location where at least one related query was generated.

Also, in at least one embodiment of the invention, the amount of query dilation is configurable for different instances of searching and/or for different qualities of speech recognizer.

Additionally, as described herein, at least one embodiment of the invention includes techniques for performing a search on a voice query. Such techniques include generating a set of multiple query terms based on information derived by a speech recognizer component processing a voice query, processing the set of query terms with multiple dilation operator to produce multiple dilated sub-sets of query terms, selecting at least one query term from each dilated sub-set to compose a query set, and performing a search on the query set. The results of the search can be ranked such that results occurring in more elements of the dilated sub-sets are ranked higher. Additionally, the selecting step can include each dilation operator generating possible query terms and selecting the top k output of each dilation operator based on a pre-determined threshold.

The techniques depicted in FIG. 3 can also include ranking the dilated set of queries, for example, according to query occurrence in the at least one dilation operator.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures and/or described herein. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

An example embodiment of the invention includes a system for contextual voice query dilation in a Spoken Web search that includes a memory, at least one processor coupled to the memory, and distinct software modules, each embodied on a tangible computer-readable medium, including the following: a speech recognition module, executing on the processor, for generating a set of multiple voice query terms based on a voice query, a dilation operations module, executing on the processor, for processing the set of query terms to produce a dilated set of queries, and a ranking module, executing on the processor, for ranking the dilated set of queries and outputting a ranked query set.

Additionally, the techniques depicted in connection with FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
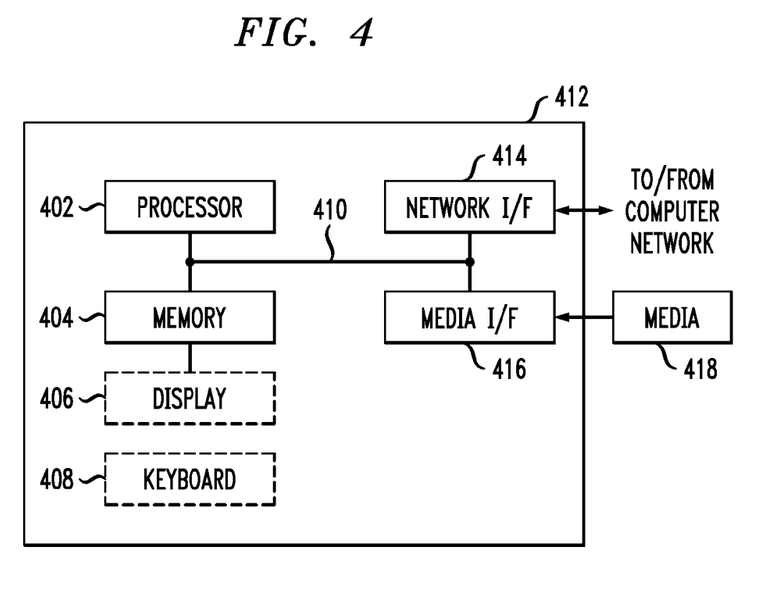
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, removing the dependency on speech recognition of an entire search result set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer readable storage medium having computer readable instructions tangibly embodied thereon which, when implemented, cause a computer to carry out a plurality of method steps comprising:
   determining a context in which a voice query is created;
   generating a set of multiple voice query terms based on the context and information derived by a speech recognizer component pertaining to the voice query;
   processing the set of query terms with a set of multiple dilation operators to produce a dilated set of queries associated with each of the multiple dilation operators;
   searching the dilated set of queries for each of the associated dilation operators against a database to identify one or more documents from the database that are relevant to each query in the dilated set of queries; and
   generating a ranked list comprising each of the one or more documents identified in the database, wherein said ranked list is generated based on (i) a first set of one or more weights assigned to the set of multiple dilation operators in said processing of the query terms and (ii) a second set of one or more weights assigned to each of the multiple dilation operators corresponding to each document, wherein the first set of one or more weights is based on speech-to-text quality and the second set of one or more weights is based on context.

2. The article of manufacture of claim 1, wherein the method steps comprise ranking the dilated set of queries.

3. The article of manufacture of claim 2, wherein said ranking comprises ranking according to query occurrence in the at least one dilation operator.

4. The article of manufacture of claim 1, wherein said determining comprises analyzing at least one of demographics of the user, social network information, and prior user preferences.

5. The article of manufacture of claim 1, wherein said processing comprises determining a weighted list of search terms that are commonly searched by a related group of users.

6. The article of manufacture of claim 1, wherein said processing comprises identifying prior searches performed by a user.

7. A system for contextual voice query dilation in a Spoken Web search, comprising:
   a memory;
   at least one processor coupled to the memory; and
   at least one distinct software module, each distinct software module being embodied on a tangible computer-readable medium, the at least one distinct software module comprising:
   a speech recognition module, executing on the processor, for generating a set of multiple voice query terms based on a voice query;
   a dilation operations module, executing on the processor, for processing the set of query terms with a set of multiple dilation operators to produce a dilated set of queries associated with each of the multiple dilation operators;
   a module, executing on the processor, for searching the dilated set of queries for each of the associated dilation operators against a database to identify one or more documents from the database that are relevant to each query in the dilated set of queries; and
   a ranking module, executing on the processor, for generating a ranked list comprising each of the one or more documents identified in the database, wherein said ranked list is generated based on (i) a first set of one or more weights assigned to the set of multiple dilation operators in said processing of the query terms and (ii) a second set of one or more weights assigned to each of the multiple dilation operators corresponding to each document, wherein the first set of one or more weights is based on speech-to-text quality and the second set of one or more weights is based on context.

8. The system of claim 7, wherein said ranked list comprises ranking according to query occurrence in the at least one dilation operator.

9. The system of claim 7, wherein said processing comprises determining a weighted list of search terms that are commonly searched by a related group of users.

10. The system of claim 7, wherein said processing comprises identifying prior searches performed by a user.

* * * * *